United States Patent
Kurata et al.

(10) Patent No.: US 6,262,173 B1
(45) Date of Patent: Jul. 17, 2001

(54) THERMOPLASTIC RESIN COMPOSITION HAVING EXCELLENT LONG-TERM HEAT-AGING PROPERTIES

(75) Inventors: Takashi Kurata; Yukio Hosaka, both of Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/351,298

(22) Filed: Jul. 12, 1999

(30) Foreign Application Priority Data

Jul. 15, 1998 (JP) .................................................. 10-200378

(51) Int. Cl.⁷ .................................................. C08G 63/48
(52) U.S. Cl. .................................................. 525/63
(58) Field of Search .................................................. 525/63

(56) References Cited

FOREIGN PATENT DOCUMENTS

| | | |
|---|---|---|
| 4309142 | 9/1994 | (DE) . |
| 0096301A2 | 12/1983 | (EP) . |

Primary Examiner—Terressa M. Boykin
(74) Attorney, Agent, or Firm—Nixon & Vanderhye

(57) ABSTRACT

The present invention relates to a thermoplastic resin composition with excellent long-term heat-aging properties, comprising:

(I) 10 to 45% by weight of a rubber-modified thermoplastic resin obtained by graft polymerizing at least one monomer selected from the group consisting of aromatic vinyl compounds, vinyl cyanide compounds and other vinyl monomers copolymerizable therewith in the presence of a rubber-like polymer;

(II) 5 to 30% by weight of a thermoplastic resin obtained by copolymerizing the monomers comprising an aromatic vinyl compound, a vinyl cyanide compound and optionally other vinyl monomer copolymerizable therewith; and (III) 50 to 70% by weight of a polycarbonate resin,
the content of the vinyl cyanide compound in the whole produced composition being 3 to 12% by weight.

8 Claims, No Drawings

THERMOPLASTIC RESIN COMPOSITION HAVING EXCELLENT LONG-TERM HEAT-AGING PROPERTIES

BACKGROUND OF THE INVENTION

The present invention relates to a thermoplastic resin composition having excellent long-term heat-aging properties. More particularly, it relates to a thermoplastic resin composition having excellent impact resistance, heat resistance, chemical resistance and weather resistance, and further remarkably improved in long-term heat-aging properties.

Polycarbonate (PC) resins have excellent heat resistance and mechanical properties, the molded products thereof are excessively reduced in impact strength when they are flawed because of high notch sensitivity. PC resins also have a disadvantage that it is necessitated to set the molding temperature in a high range due to too high heat resistance, so that they are inexpedient for molding of large-sized articles.

On the other hand, ABS resins (acrylonitrile-butadiene-styrene resins) are a material having a good balance of properties such as moldability, impact strength and dimensional stability, and widely used for a variety of commercial products such as automobiles, domestic electrical appliances, OA machines, etc., but they have a disadvantage that they are low in heat resistance. Japanese Patent Publication (KOKOKU) No. 38-15225 proposes blending of a PC resin with an ABS resin having good compatibility with the PC resin to thereby improve such properties as notched impact strength, molding workability and heat resistance. The PC resin/ABS resin polymer alloys (which may hereinafter be referred to as "PC/ABS polyblends") are now one of the typical resin compositions popularly used in the fields of OA machines, vehicles and such.

Another drawback to the ABS resins is poor weather resistance due to use of butadiene rubber. Japanese Patent Publication (KOKOKU) No. 51-24540 proposes polyblending of a PC resin and an AES resin using ethylene-propylene (EP) rubber to improve stain resistance. Japanese Patent Publication (KOKOKU) No. 1-57699 proposes addition of a specific plasticizer to the PC resin/AES resin polymer alloys (which may hereinafter be referred to as "PC/AES polyblends") to improve weld strength. Further, Japanese Patent Publication KOKOKU) No. 3-40064 proposes optimization of the rubber content, graft ratio and molecular weight of the PC/AES polyblends to improve weld appearance and coating properties. Japanese Patent Publication (KOKOKU) No. 1-17501 proposes polyblending of the three types of resin, i.e. PC resin, ABS resin and AES resin, to improve low-temperature impact strength, weld strength and color development. Japanese Patent Publication (KOKOKU) No. 4-29696 proposes addition of α-alkylstyrene as the graft resin component of the PC/AES polyblends to improve thermal decomposability in the course of granulation and molding work. Japanese Patent Publication (KOKOKU) No. 4-56063 proposes optimization of melt viscosity of the AES resin in the PC/AES polyblends to improve weld strength. Japanese Patent Publication (KOKOKU) No. 5-79699 proposes optimization of the rubber content of the PC/AES polyblends to improve low-temperature impact strength.

As viewed above, since the PC/ABS and PC/AES polyblends have excellent properties, various use for them are found. But when these resins once molded into a product are exposed to high temperatures for a long time in a practical use environment, their properties are deteriorated drastically. This is attributable to such causes as deterioration of the PC resin, deterioration of the grafted or ungrafted resin and deterioration of the rubber, but no proposal of the attempt for solving these problems has ever been made in the past.

As a result of the present inventors' earnest studies to solve the above problems, it has been found that a thermoplastic resin composition comprising a specific rubber-modified thermoplastic resin, a specific thermoplastic resin, a polycarbonate resin and a heat-aging resistor, with the content of vinyl cyanide compound in the whole composition being defined, has excellent long-term heat-aging properties.

The present invention has been attained on the basis of the above finding.

SUMMARY OF THE INVENTION

The object of the present invention is to provide a thermoplastic resin composition having excellent long-term heat-aging properties as well as high impact strength and heat resistance by adding a specific thermoplastic resin to a polymer alloy of a polycarbonate resin and a rubber-modified thermoplastic resin.

To attain the above aim, in the first aspect of the present invention, there is provided a thermoplastic resin composition with excellent long-term heat-aging properties, comprising:

(I) 10 to 45% by weight of a rubber-modified thermoplastic resin obtained by graft polymerizing at least one monomer selected from the group consisting of aromatic vinyl compounds, vinyl cyanide compounds and other vinyl monomers copolymerizable therewith in the presence of a rubber-like polymer, the graft ratio of the polymerizate being 10 to 100% and the intrinsic viscosity η of the methyl ethyl ketone solubles at 30° C. being 0.2 to 0.8 dl/g;

(II) 5 to 30% by weight of a thermoplastic resin obtained by copolymerizing the monomers comprising an aromatic vinyl compound, a vinyl cyanide compound and optionally other vinyl monomer copolymerizable therewith, the weight ratio of aromatic vinyl compound/vinyl cyanide compound/other vinyl monomer being 50–90/10–20/0–30, and the intrinsic viscosity η of the methyl ethyl ketone solubles at 30° C. being 0.3 to 0.6 dl/g; and (III) 50 to 70% by weight of a polycarbonate resin, the total amount of (I), (II) and (III) being 100% by weight, and the content of the vinyl cyanide compound in the whole produced composition being 3 to 12% by weight.

In the second aspect of the present invention, there is provided a thermoplastic resin composition with excellent long-term heat-aging properties, comprising:

(I) 10 to 45% by weight of a rubber-modified thermoplastic resin obtained by graft polymerizing at least one monomer selected from the group consisting of aromatic vinyl compounds, vinyl cyanide compounds and other vinyl monomers copolymerizable therewith in the presence of a rubber-like polymer, the graft ratio of the polymerizate being 10 to 100% and the intrinsic viscosity η of the methyl ethyl ketone solubles at 30° C. being 0.2 to 0.8 dl/g;

(II) 5 to 30% by weight of a thermoplastic resin obtained by copolymerizing the monomers comprising an aromatic vinyl compound, a vinyl cyanide compound and optionally other vinyl monomer copolymerizable therewith, the weight ratio of aromatic vinyl compound/vinyl cyanide compound/other vinyl monomer being 50–90/10–20/0–30, and the intrinsic viscosity η of the methyl ethyl ketone solubles at 30° C. being 0.3 to 0.6 dl/g;

(III) 50 to 70% by weight of a polycarbonate resin; and (IV) 0 to 2% by weight of a heat-aging resistor, the total amount of (I), (II), (III) and (IV) being 100% by weight, and the content of the vinyl cyanide compound in the whole produced composition being 3 to 12% by weight.

DETAILED DESCRIPTION OF THE INVENTION

The rubber-modified thermoplastic resin (I) used in the present invention can be obtained by graft polymerizing at least one monomer selected from the group consisting of aromatic vinyl compounds, vinyl cyanide compounds and other vinyl monomers copolymerizable therewith in the presence of a rubber-like polymer. The graft ratio of the polymerizate is 10 to 100%, and the intrinsic viscosity [η] of the methyl ethyl ketone solubles at 30° C. is 0.2 to 0.8 dl/g.

The rubber-like polymers usable for the preparation of the rubber-modified thermoplastic resin (I) include, for example, polybutadiene, butadiene-styrene copolymer, butadiene-acrylonitrile copolymer, ethylene-propylene-(nonconjugated diene) copolymer, ethylene-butene-1-(nonconjugated diene) copolymer, ethylene/hexene copolymer, ethylene/octene copolymer, isobutylene-isoprene copolymer, acrylic rubber, styrene-butadiene-styrene block copolymer, styrene-isoprene-styrene block copolymer, hydrogenated diene-based (block, random or homo) polymers such as SEBS, polyurethane rubber, and silicone rubber. In case of using silicone rubber, if a graft crosslinking agent (such as the one containing a vinyl group, γ-methacryloxypropylmethyldimethoxysilane or the like) is contained in the silicone rubber in an amount of about 0.01 to 10% by weight, there can be obtained a thermoplastic resin composition of the present invention with excellent impact resistance.

The rubber-like polymer used in the present invention is preferably selected from ethylene-propylene rubber, ethylene-propylene-nonconjugated diene rubber, acrylic rubber and silicone rubber, more preferably selected from ethylene-propylene rubber and ethylene-propylene-nonconjugated diene rubber. Examples of the nonconjugated dienes usable here include alkenyl norbornenes, cyclic dienes, aliphatic dienes and the like, of which 5-ethylidene-2-norbornene and dicyclopentadiene are preferred. These nonconjugated dienes may be used singly or as a mixture of two or more of them.

The said rubber-like polymers may also be used either singly or as a mixture or composite.

By use of two or more types of graft polymer (rubber-modified thermoplastic resins) differing in rubber particle size, a thermoplastic resin composition with even higher impact resistance and a better balance of properties is obtained. It is preferred to use, for instance, two types of rubber-like polymer, one having a particle size of 800 to 3,000 angstroms and the other 5,000 to 10,000 angstroms. In this case, it is possible to synthesize the graft polymers (rubber-modified thermoplastic resins) in the presence of two rubber-like polymers differing in particle size, or to blend two rubber-modified thermoplastic resins differing in rubber particle size.

The molecular weight of the rubber-like polymers used in the present invention is preferably not less than 60,000, more preferably not less than 70,000, in terms of polystyrene-reduced weight-average molecular weight. When the molecular weight of the rubber-like polymers is less than 60,000, the preferred impact resistance may not be obtained. The rubber-like polymers may have a three-dimensional crosslinked structure.

The percentage of the rubber-like polymers in the rubber-modified thermoplastic resin (I) is preferably 10 to 80% by weight, more preferably 20 to 70% by weight (feed percentage). When the said percentage is less than 10% by weight, the preferred impact resistance may not be obtained, while when the said percentage exceeds 80% by weight, there may arise the problems in moldability of the composition and visual appearance of its moldings.

The aromatic vinyl compounds usable as a monomer in the rubber-modified thermoplastic resin (I) include, for example, styrene, α-methylstyrene, methylstyrene, vinylxylene, monochlorostyrene, dichlorostyrene, monobromostyrene, dibromostyrene, fluorostyrene, p-t-butylstyrene, ethylstyrene and vinylnaphthalene. These compounds may be used singly or as a mixture of two or more of them. The preferred aromatic vinyl compound for use in the present invention is styrene or an aromatic vinyl compound containing styrene in an amount of not less than 50% by weight.

The percentage of the aromatic vinyl compound(s) in the monomers is preferably 60 to 90% by weight, more preferably 65 to 85% by weight.

The vinyl cyanide compounds usable as another monomer include acrylonitrile, methacrylonitrile and the like, of which acrylonitrile is preferred.

The percentage of the vinyl cyanide compound in the monomers is preferably 10 to 40% by weight, more preferably 15 to 35% by weight.

Other copolymerizable vinyl monomers usable for graft polymerization in the present invention include (meth) acrylic ester monomers, for example, acrylic esters such as methyl acrylate, ethyl acrylate, propyl acrylate, butyl acrylate, amyl acrylate, hexyl acrylate, octyl acrylate, 2-ethylhexyl acrylate, cyclohexyl acrylate and phenyl acrylate, and methacrylic esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate; unsaturated acid anhydrides such as maleic anhydride and itaconic anhydride; unsaturated acids such as acrylic acid and methacrylic acid; and maleimide monomers, for example, imide compounds of α,β-unsaturated dicarboxylic acids such as N-methylmaleimide, N-butylmaleimide, N-phenylmaleimide and N-cyclohexylmaleimide. Of these vinyl monomers, methyl methacrylate, N-phenylmaleimide and N-cyclohexylmaleimide are preferred. These other vinyl monomers can be used either singly or as a mixture of two or more of them.

The percentage of the said other vinyl monomer(s) in the monomer mixture is preferably not more than 50% by weight, more preferably not more than 30% by weight.

The rubber-modified thermoplastic resin (I) used in the present invention can be produced by the known polymerization methods such as emulsion polymerization, solution polymerization and suspension polymerization. In case where the resin (I) is produced by emulsion polymerization, it is usually purified by coagulating it with a coagulant, washing the produced powder with water and drying the product. As the coagulant, usually an inorganic salt such as calcium chloride, magnesium sulfate, magnesium chloride, sodium chloride or the like is used. It is to be noted that when the produced rubber-modified thermoplastic resin (I) is blended in a polycarbonate resin (III), there may arise the problem of causing a reduction of molecular weight of the polycarbonate resin (III) due to the residual salt or emulsifier in the component (I). It is therefore preferable to use an acid such as sulfuric acid as the coagulant.

As the radical initiator for the graft polymerization, it is possible to use the commonly used ones, such as, for example, cumene hydropeoxide, diisopropylbenzene hydroperoxide, potassium persulfate, azobisisobutylonitrile, benzoyl peroxide, lauroyl peroxide, t-butyl peroxylaurate, and t-butyl peroxymonocarbonate.

The amount of the radical initiator used is usually 0.05 to 5% by weight, preferably 0.1 to 1% by weight, based on the monomers.

The objective effect of the present invention can be obtained by properly selecting an organic peroxide or a solvent for allowing progress of uniform graft reaction in graft polymerization, synthesizing a rubber-like polymer by emulsion polymerization, carrying out graft polymerization by emulsion polymerization, initiating the polymerization by uniformly dissolving the rubber-like polymer, and designing appropriate polymerization means such as conducting solution or bulk polymerization by dissolving the melted and kneaded monomeric mixture in a solution or conducting emulsion or suspension polymerization of the re-emulsified product.

The graft ratio of the thus obtained rubber-modified thermoplastic resin (I) is 10 to 100%, preferably 30 to 80%. When the graft ratio is below 10%, the interfacial adhesion strength between resin and rubber lowers, making it unable to obtain high impact strength. On the other hand, when the graft ratio exceeds 100%, the interfacial layer is enlarged in thickness and also a grafted resin layer is created in the inside of the rubber to cause a decrease of rubber elasticity, resulting in an unsatisfactory impact strength of the composition.

The said graft ratio can be easily adjusted by changing the type and amount of the rubber-like polymer, polymerization initiator, chain transfer agent, emulsifier, etc., and the polymerization conditions such as polymerization time and polymerization temperature.

The "graft ratio (%)" referred to herein is the value given from the following equation:

$$\text{Graft ratio (\%)} = [(y-x)/x] \times 100$$

wherein x is rubber moiety in the component (I) and y is methyl ethyl ketone insolubles in the component (I).

The intrinsic viscosity $[\eta]$ (measured in methyl ethyl ketone at 30° C.) of the methyl ethyl ketone solubles in the rubber-modified thermoplastic resin (I) of the present invention is 0.2 to 0.8 dl/g, preferably 0.3 to 0.7 dl/g. With the intrinsic viscosity $[\eta]$ falling within the above-defined range, it is possible to obtain a thermoplastic resin composition of the present invention with excellent impact resistance and molding workability (fluidity). The said intrinsic viscosity $[\eta]$ can be easily controlled by changing the type and amount of the polymerization initiator, chain transfer agent, emulsifier, solvent, etc., and the polymerization conditions such as polymerization time and polymerization temperature.

Examples of the rubber-modified thermoplastic resins (I) usable in the present invention include ABS resins, AES resins, ASA resins (polymers obtained by grafting AS resins to acrylic rubber), and ASS resins (polymers obtained by grafting AS resins to silicone rubber). Of these resins, AES resins, ASA resins and ASS resins are preferred, and AES resins being especially preferred.

The percentage of the rubber-modified thermoplastic resin (I) in the thermoplastic resin composition of the present invention is 10 to 45% by weight, preferably not less than 10% and less than 45% by weight, more preferably 20 to 40% by weight based on 100% by weight of total amount of (I), (II), (III) and (IV). When the said percentage is less than 10% by weight, the composition tends to have unsatisfactory impact strength, while when the said percentage exceeds 45% by weight, fluidity of the composition and visual appearance of its moldings may be deteriorated.

The thermoplastic resin (II) used in the present invention is obtained by copolymerizing the monomers comprising an aromatic vinyl compound, a vinyl cyanide compound and, if necessary, other vinyl monomer copolymerizable therewith. The weight ratio of aromatic vinyl compound/vinyl cyanide compound/other copolymerizable vinyl monomer is 50–90/10–20/0–30, and the intrinsic viscosity $[\eta]$ of the methyl ethyl ketone solubles at 30° C. is 0.3 to 0.6 dl/g.

The aromatic vinyl compound, vinyl cyanide compound and other vinyl monomer used in the thermoplastic resin (II) are the same as those used for the preparation of the rubber-modified thermoplastic resin (I) mentioned above.

The thermoplastic resin (II) used in the present invention can be produced by known polymerization methods such as emulsion polymerization, solution polymerization and suspension polymerization. In case where the resin (II) is produced by emulsion polymerization, it is usually purified by coagulating the polymerization product with a coagulant, washing the obtained powder with water and drying it. As the coagulant, usually an inorganic salt such as calcium chloride, magnesium sulfate, magnesium chloride or sodium chloride is used. It is to be noted that when the obtained thermoplastic resin (II) is blended in a polycarbonate resin (III), there may take place a reduction of molecular weight of the polycarbonate resin (III) due to the residual salt or emulsifier in the component (II). It is therefore preferable to use an acid such as sulfuric acid as the coagulant.

In the thermoplastic resin (II) used in the present invention, the ratio by weight of aromatic vinyl compound/vinyl cyanide compound/other vinyl monomer is 50–90/10–20/0–30, preferably 72 to 85/15 to 18/0 to 10. When the ratio of the aromatic vinyl compound is less than 50% by weight, compatibility of the resin (II) with the polycarbonate resin (III) may lower, resulting in unsatisfactory impact strength and heat stability of the composition. When the ratio of the aromatic vinyl compound exceeds 90% by weight, also compatibility of the resin (II) with the polycarbonate resin (III) may lower, causing deterioration of impact strength and chemical resistance of the composition. When the ratio of the vinyl cyanide compound is less than 10% by weight, compatibility with the polycarbonate resin (III) may lower excessively, giving rise to such problems as reduction of impact strength and exfoliation of the surface layer, and when the ratio of the vinyl cyanide compound exceeds 20% by weight, the heat-aging properties of the composition may be deteriorated. It is a feature of the present invention that a vinyl cyanide compound is used in a defined range of ratio, i.e. 10 to 20% by weight, for markedly improving the heat-aging properties of the composition. When other vinyl monomer is used in excess of 30% by weight, compatibility with the polycarbonate resin (III) may deteriorate to reduce impact strength of the composition. It is preferred that the ratio by weight of aromatic vinyl compound/vinyl cyanide compound/other vinyl monomer in the thermoplastic resin (II) is different from the ratio by weight of aromatic vinyl compound/vinyl cyanide compound/other vinyl monomer in the thermoplastic resin (I)

The intrinsic viscosity [η] at 30° C. of the methyl ethyl ketone solubles in the thermoplastic resin (II) according to the present invention is 0.3 to 0.6 dl/g, preferably 0.35 to 0.45 dl/g. When the viscosity is less than 0.3 dl/g, the produced composition may be poor in impact strength, and when the viscosity exceeds 0.6 dl/g, the composition may be greatly reduced in fluidity.

The percentage of the thermoplastic resin (II) in the thermoplastic resin composition of the present invention is 5 to 30% by weight, preferably 10 to 20% by weight based on 100% by weight of total amount of (I), (II), (III) and (IV). When the percentage of the resin (II) is less than 5% by weight, the heat-aging properties may be deteriorated excessively, and when it exceeds 30% by weight, impact strength of the composition may be greatly reduced.

The polycarbonate resins (III) usable for the preparation of the thermoplastic resin composition of the present invention include those obtained from the reactions between various dihydroxyarryl compounds and phosgene (phosgene method) and those obtained from the ester exchange reactions between dihydroxyarryl compounds and diphenyl carbonate (ester exchange method). The preferred polycarbonate resins for use in the present invention are the aromatic polycarbonate resins, a typical example of which is 2,2'-bis (4-hydroxyphenyl)propane, that is, a polycarbonate resin obtained from the reaction between bisphenol A and phosgene.

Examples of the dihyroxyarryl compounds usable as a starting material of the said polycarbonate resins include bis(4-hydroxyphenyl)methane, 1,1'-bis(4-hydroxyphenyl) ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxyphenyl)phenylmethane, 2,2'-bis(4-hydroxy-3-methylphenyl)propane, 2,2'-bis(4-hydroxy-3-t-butylphenyl)propane, 2,2'-bis(4-hydroxy-3-bromophenyl) propane, 2,2'-bis(4-hydroxy-3,5-dichlorophenyl)propane, 1,1'-bis(4-hydroxyphenyl)cyclopentane, 1,1'-bis(4-hydroxyphenyl)cylcohexane, 4,4'-dihydroxydiphenyl ether, 4,4'-dihydroxy-3,3'-dimethyldiphenyl ether, 4,4'-dihydroxphenyl sulfide, 4,4'-dihydroxy-3,3'-dimethylphenyl sulfide, 4,4'-dihydroxy-3,3'-dimethylphenyl sulfoxide, 4,4'-dihydroxyphenyl sulfoxide, 4,4'-dihydroxyphenylsulfone, 4,4'-dihydroxy-3,3'-dimethylphenylsulfone, 1,1'-bis(4-hydroxyphenyl)-3,3,5-trimethylcyclohexane, 1,1'-bis(4-hydroxyphenyl)-3,3-dimethylcyclohexane, 1,1'-bis(4-hydorxyphenyl)-3,3,5-trimethylcyclopentane, hydroquinone, and resorcin. These compounds may be use singly or in combination. 2,2'-bis (4-hydroxyphenyl)propane, i.e. bisphenol A, is especially preferred.

The viscosity-average molecular weight of the polycarbonate resin (III) is preferably 15,000 to 40,000, more preferably 17,000 to 30,000, especially preferably 18,000 to 28,000. A higher molecular weight provides a better notched impact resistance but gives a lower fluidity. It is possible to use two or more types of polycarbonate differing in molecular weight.

The percentage of the polycarbonate resin in the thermoplastic resin composition (III) of the present invention is 50 to 70% by weight, more preferably 55 to 65% by weight based on 100% by weight of total amount of (I), (II), (III) and (IV). When the polycarbonate resin percentage is less than 50% by weight, the composition may be unsatisfactory in heat resistance, and when the percentage exceeds 70% by weight, fluidity of the composition may lower excessively.

As the heat-aging resistor (IV) in the thermoplastic resin composition of the present invention, there can be used, for instance, phenol type (phenol derivatives), phosphorus type (heat-aging resistors containing phosphorus), sulfur type (heat-aging resistors containing sulfur), lactone type and the like. A phenol/phosphorus/sulfur three-type mixture is preferred. By using this three-type mixture as the heat-aging resistor (IV), the effect of enabling retention of tensile elongation can be attained when the composition is exposed to a high temperature for a long time. of these heat-aging resistors (IV), the phenol type includes 2,6-di-t-butylphenol derivatives, 2-methyl-6-t-butylphenol derivatives, octadecyl-3(3,5-di-t-butyl-4-hydroxyphenyl) propionate, 4,4'-butylidene-bis(6-t-butyl-m-cresol), pentaerythrityl-tetrakis[3-(3,5-di-t-butyl-4-hydroxyphenyl) propionate], 2[1-(2-hydroxy-3,5-di-t-pentylphenyl)-ethyl]-4,6-di-t-pentylphenyl acrylate, and 2-t-butyl-6(3-t-butyl-2-hydroxy-5-methylbenzyl)-4-methylphenyl acrylate.

The phosphorus type includes tris(2,4-di-t-butylphenyl) phosphite, cyclic neopentanetetraylbis(2,4-di-t-butylphenyl phosphite), distearylpentaerythritol diphosphite, sodium dihydrogenphosphate, and disodium monohydrogenphosphate.

The sulfur type includes dodecyl 3,3'-thiobispropionate, octadecyl 3,3'-thiobispropionate, pentaerythritol-tetrakis-(3-laurylpropionate), and dilauryl-3,3'-thiodipropionate.

The lactone type includes 5,7-di-t-butyl-3-(3,4-dimethylphenyl)-3H-benzofuran-2-one.

The percentage of the heat-aging resistor (IV) in the thermoplastic resin composition of the present invention is 0 to 2% by weight, preferably not less than 0 but not greater than 2% by weight, more preferably not less than 0 but not greater than 1% by weight based on 100% by weight of total amount of (I), (II), (III) and (IV). In the thermoplastic resin composition of the present invention, the resins (components (I) and (II)) other than the polycarbonate resin (III) are improved in their heat-aging properties by the addition of a heat-aging resistor, but the polycarbonate resin may be adversely affected by the addition of a heat-aging resistor as it might act as a catalyst which promotes hydrolysis. In view of these antagonistic effects, it is expedient to add the heat-aging resistor in an amount not exceeding 2% by weight for providing a maximal heat-aging resistance.

The percentage of the vinyl cyanide compound in the thermoplastic resin composition of the present invention is 3 to 12% by weight, preferably 5 to 10% by weight. When the percentage of the vinyl cyanide compound exceeds 12% by weight, the composition may be deteriorated in heat-aging properties, and when the percentage is less than 3% by weight, compatibility with the polycarbonate resin may lower to deteriorate impact strength of the composition.

The thermoplastic resin composition according to the present invention may contain if necessary one or more types of filler such as glass fiber, carbon fiber, glass beads, wollastonite, rock filler, calcium carbonate, talc, mica, glass flakes, mild fiber, barium sulfate, graphite, molybdenum disulfide, magnesium oxide, zinc oxide whiskers, potassium titanate whiskers, etc. Blending of such fillers affords rigidity and high-temperature deformation resistance to the composition. Also, addition of talc, calcium carbonate or the like provides a matte effect to the composition. The preferred size of the glass fibers and carbon fibers for use in the present invention is 6 to 60 μm in diameter and 30 μm or more in length.

It is also possible to blend the known additives such as weathering agent, lubricant, colorant, antistatic agent, silicone oil, etc., in the thermoplastic resin composition of the present invention. As the weathering agent, phosphorus type, benzotriazole type, triazine type, benzophenone type and the like are preferred. As the lubricant, ethylenebisstearylamide, hardened castor oil and the like are preferably used. Carbon black, red oxide and the like can be used as the colorant. Polyethers and sulfonates having alkyl groups can be cited as examples of the antistatic agent.

The thermoplastic resin composition of the present invention can be obtained by kneading the component materials by using various types of extruder, Banbury mixer, kneader, rolls or the like. Use of a double-screw extruder is preferred. Regarding the way of kneading of the component materials, they may be either kneaded all together or may be kneaded according to a multi-stage addition system.

The thermoplastic resin composition of the present invention may be molded into various products by the known molding methods such as injection molding, sheet extrusion, vacuum forming, contour extrusion, expansion molding, etc.

The thus obtained molded products can be used for various applications by making use of their excellent properties; for example, they can be used as disc tray material, housing material, etc., for OA machines, domestic electrical appliances, vehicles, etc.

The thermoplastic resin composition according to the present invention can be used without suffering remarkable changes of properties even in long-time use under high temperatures, and is capable of prolonging the life of its products and contributing to the safety thereof. The composition also has excellent fluidity and is therefore preferred for large-sized moldings.

EXAMPLES

The present invention is described in further detail by showing its Examples and Comparative examples, but it is to be understood that these examples are merely intended to be illustrative and not to be construed as limiting the scope of the invention.

In the following Examples and Comparative Examples, all "parts" and "%" are by weight unless otherwise noted. Various evaluations in these Examples and Comparative Examples were made in the manner described below.

(1) Average Particle Size

It was confirmed by electron microscopical observation that the particle size of the latex previously synthesized in an emulsified state was equal to the size of the dispersed particles in the resin, so that the size of the dispersed particles in the latex was measured by the light scattering method using a laser particle size analyzing system LPA-3100 (mfd. by Otsuka Electronics Co., Ltd.) according to the cumulant method (70 times integration).

(2) Graft Ratio

Already described above.

(3) Intrinsic Viscosity [η]

The sample was dissolved in methyl ethyl ketone as the solvent, and the viscosity of the solution was measured by an Ubbellohde viscometer at 30° C.

(4) Izod Impact Strength

Measured according to ASTM D256 using the notched test specimens, 2.5×½×¼ inches.

(5) Fluidity (melt flow rate)

Measured according to ASTM D1238 at 240° C. under a load of 10 kg. Unit: g/10 min.

(6) Long-term Heat-aging Properties

In the tensile elongation at break test according to ASTM D638, the initial elongation at break and the elongation at break after left in a 110° C. high-temperature environment for 2,400 hours were measured to determine retention of elongation at break.

The component materials used in the Examples and Comparative Examples are as follows.

(7) Preparation of Component (I)

Preparation of ABS resin (I-1)

To a glass-made 7-litre flask equipped with a stirrer, 100 parts of ion exchange water, 1.5 parts of disproportionated sodium rosinate, 0.1 part of t-dodecylmercaptan, 40 parts (calcd. as solids) of polybutadiene (#0700 produced by JSR Corp.), 15 parts of styrene and 5 parts of acrylonitrile were supplied and heated with stirring. At a point when the temperature reached 45° C., an aqueous activator solution comprising 0.1 part of sodium ethylenediaminetetraacetate, 0.003 part of ferrous sulfate, 0.2 part of formaldehyde sodium sulfoxylate dihydrate and 15 parts of ion exchange water, and 0.1 part of diisopropylbenzene hydroperoxide were added, allowing the reaction to continue for one hour. Thereafter, the increment polymerization materials comprising 50 parts of ion exchange water, 1 part of disproportionated sodium rosinate, 0.1 part of t-dodecylmercaptan, 0.2 part of diisopropyl hydroperoxide, 30 parts of styrene and 10 parts of acrylonitrile were added continuously over a period of 3 hours to continue the polymerization. After completion of the addition, the reaction mixture was further stirred for one hour, then 0.2 part of 2,2-methylene-bis-(4-ethylene-6-t-butylphenol) was added, and the reaction product was taken out of the flask. The reaction product (latex) was coagulated with 2 parts of sulfuric acid, washed well with water and dried at 75° C. for 24 hours to obtain a white powder. Polymerization conversion: 97.2%; graft ratio: 75%; intrinsic viscosity: 0.44 dl/g.

Preparation of ABS resins (I-1-a) to (I-1-d)

The ABS resins specified in Table 1 were prepared in the same way as the preparation of the ABS resin (I-1) described above.

TABLE 1

| ABS resins | I-1-a | I-1-b | I-1-b | I-1-b |
|---|---|---|---|---|
| Graft ratio (%) | 15 | 95 | 50 | 50 |
| Intrinsic viscosity [η] (dl/g) | 0.5 | 0.5 | 0.2 | 0.8 |

Preparation of AES resin (I-2)

To a stainless 10-litre autoclave equipped with a ribbon type stirrer, 20 parts of EPDM [EP-82 produced by JSR Corp.], 55 parts of styrene, 25 parts of acrylonitrile and 100 parts of toluene were supplied, stirred and heated, and the produced rubber-like polymer was completely dissolved to obtain a homogeneous solution. Then 0.1 part of t-dodecylmercaptan, 0.5 part of benzoyl peroxide and 0.1 part of dicumyl peroxide were added and stirred at 200 rpm while controlling the temperature to stay constant at 95° C. to carry out polymerization. The temperature was raised to 120° C. using one hour after passage of 6 hours from start of the reaction, and the reaction was further continued for 2 hours and then terminated. The polymerization conversion was 97%. After cooling the reaction mixture to 100° C., 0.2 part of 2,2-methylene-bis-4-methyl-6-butylphenol was added and then the reaction mixture was taken out from the autoclave and subjected to steam distillation to remove the unreacted materials and the solvent. The reaction product was finely ground and supplied to a 40 mmΦ vented extruder (220° C., 700 mmHg), whereby the volatiles were substantially evaporated away and the polymer was pelletized. Graft ratio: 70%; intrinsic viscosity: 0.42 dl/g.

Preparation of ASA resin (I-3)

To a 7-litre glass-made flask equipped with a stirrer, 100 parts of ion exchange water, 1.5 parts of sodium oleate, 0.1 part of t-dodecylmercaptan, 40 parts (calcd. as solids) of acrylic rubber (20LAR produced by Techno-Polymer Co., Ltd.), 15 parts of styrene and 5 parts of acrylonitrile were supplied and heated with stirring. At a point when the temperature reached 45° C., an aqueous activator solution comprising 0.1 part of sodium ethylenediaminetetraacetate, 0.003 part of ferrous sulfate, 0.2 part of formaldehyde sodium sulfoxylate dihydrate and 15 parts of ion exchange water, and 0.1 part of diisopropylbenzene hydroperoxide were added and the reaction was continued for one hour. Then the increment polymerization materials comprising 50 parts of ion exchange water, 1 part of sodium oleate, 0.1 part of t-dodecylmercaptan, 0.2 part of diisopropylbenzene hydroperoxide, 30 parts of styrene and 10 parts of acrylonitrile were added continuously over a period of 3 hours to carry out the polymerization. After completion of the addition, the reaction mixture was further stirred for one hour, then 0.2 part of 2,2-methylene-bis-(4-ethylene-6-t-butylphenol) was added, and the reaction product was taken out from the flask. The reaction product latex was coagulated with 2 parts of sulfuric acid, washed well with water and then dried at 75° C. for 24 hours to obtain a white powder. Polymerization conversion: 96.5%; graft ratio: 55%; intrinsic viscosity: 0.41 dl/g.

Preparation of ASS resin (I-4)

1.5 part of p-vinylphenylmethyldimethoxysilane and 98.5 parts of octamethylcyclotetrasiloxane were mixed and poured into 300 parts of distilled water in which 2.0 parts of dodecylbenzenesulfornic acid had been dissolved, and the mixture was stirred for 3 minutes by a homomixer to effect emulsification and dispersion. The mixed solution was transferred into a separable flask equipped with a condenser, a nitrogen inlet and a stirrer, heated at 90° C. for 6 hours with stirring, and then cooled at 5° C. for 24 hours to complete the condensation reaction. The condensation rate of the obtained modified polyorganosiloxane was 92.8%. The latex of this modified polyorganosiloxane was neutralized to pH 7 with a sodium carbonate solution. The average particle size of the obtained modified polyorganosiloxane latex was 2,800 angstroms.

To a 7-litre glass-made flask equipped with a stirrer, 100 parts of ion exchange water, 1.5 part of sodium dodecylbenzenesulfonate, 0.1 part of t-dodecylmercaptan, 40 parts (calcd. as solids) of the said modified polyorganosiloxane, 15 parts of styrene and 5 parts of acrylonitrile were supplied and heated with stirring. At a point when the temperature reached 45° C., an aqueous activator solution comprising 0.1 part of sodium ethylenediaminetetraacetate, 0.003 part of ferrous sulfate, 0.2 part of formaldehyde sodium sulfoxylate and 15 parts of ion exchange water, and 0.1 part of diisopropylbenzene hydroperoxide were added and the reaction was continued for one hour. Then the increment polymerization materials comprising 50 parts of ion exchange water, 1 part of sodium dodecylbenzenesulfonate, 0.1 part of t-dodecylmercaptan, 0.2 part of diisopropyl hydroperoxide, 30 parts of styrene and 10 parts of acrylonitrile were added continuously over a period of 3 hours to carry out the polymerization. After the end of the addition, the mixture was further stirred for one hour, then 0.2 part of 2,2-methylene-bis-(4-ethylene-6-t-butylphenyl) was added, and the reaction product was taken out from the flask. The produced latex was coagulated with 2 parts of calcium chloride, washed well with water and then dried at 75° C. for 24 hours to obtain a white powder. Polymerization conversion: 97.2%; graft ratio: 90%; intrinsic viscosity: 0.47 dl/g.

Preparation of component (II) (II-1 to II-5)

To a 7-litre glass-made flask equipped with a stirrer, 300 parts of ion exchange water, 1.5 part of sodium oleate, 0.1 part of t-dodecylmercaptan and a monomer shown in Table 2 were supplied and heated with stirring. At a point when the temperature reached 45° C., 0.8 part of potassium persulfate and 0.2 part of acidic sodium sulfite were added and the reaction was continued for 3 hours. The reaction mixture was further stirred for one hour, then 0.2 part of 2,2-methylene-bis-(4-ethylene-6-t-butylphenyl) was added and the reaction product (latex) was taken out from the flask. The produced latex was coagulated with 2 parts of sulfuric acid, washed well with water and then dried at 75° C. for 24 hours to obtain a white powder.

TABLE 2

| Thermoplastic resin<br>Monomer composition (parts) | II-1 | II-2 | II-3 | II-4 | II-5 |
|---|---|---|---|---|---|
| Styrene | 88 | 83 | 80 | 73 | 50 |
| Acrylonitrile | 12 | 17 | 20 | 17 | 20 |
| Methylmethacrylate | — | — | — | 10 | 30 |
| Polymerization conversion (%) | 97.2 | 97.8 | 97.7 | 97.5 | 97.8 |
| Intrinsic viscosity [η] (dl/g) | 0.30 | 0.37 | 0.45 | 0.35 | 0.33 |

Preparation of component (III)

The following polycarbonate resins produced by Mitsubishi Engineering-Plastics Corporation were used:

III-1: IUPIRON H2000

III-2: NOVAREX 7022PJ

Preparation of component (IV)

The following materials were used. Phenol type 1: 2[1-(2-hydroxy-3,5-di-t-pentylphenyl)-ethyl]-4,6-di-t-pentylphenyl acrylate Phenol type 2: 4,4'-butylidene-bis(6-t-butyl-m-cresol) Phosphorus type 1: tris(2,4-di-t-butylphenyl) phosphite Phosphorus type 2: sodium dihydrogenphosphate Sulfur type 1: pentaerythritol-tetrakis-(3-laurylthiopropionate) Sulfur type 2: didodecyl 3,3'-thiobispropionate Preparation of comparative materials for component (II) (C-1 to C-4)

To a 7-litre glass-made flask equipped with a stirrer, 300 parts of ion exchange water, 1.5 part of sodium oleate, 0.1 part of t-dodecylmercaptan and a monomer shown in Table 3 were supplied and heated with stirring. At a point when the temperature reached 45° C., 0.8 part of potassium persulfate and 0.2 part of acidic sodium sulfite were added and the reaction was continued for 3 hours. The reaction mixture was further stirred for one hour, then 0.2 part of 2,2-methylene-bis-(4-ethylene-6-t-butyphenyl) was added and the reaction product (latex) was taken out from the flask. The produced latex was coagulated with 2 parts of sulfuric acid, washed well with water and then dried at 75° C. for 24 hours to obtain a white powder.

TABLE 3

| Comparative thermoplastic resin | C-1 | C2 | C-3 | C-4 |
|---|---|---|---|---|
| Monomer composition (parts) | | | | |
| Styrene | 75 | 95 | 83 | 83 |
| Acrylonitrile | 25 | 5 | 17 | 17 |
| Polymerization conversion (%) | 97.5 | 97.3 | 97.4 | 97.8 |
| Intrinsic viscosity [η] (dl/g) | 0.30 | 0.37 | 0.25 | 0.65 |

EXAMPLES 1 TO 22 AND COMPARATIVE EXAMPLES 1 TO 13

Preparation of Thermoplastic Resin Compositions

The components (I) and (II) and the comparative polymers were melted and kneaded by an extruder at the percentages shown in Tables 4 to 8 and at 250° C., and injection molded to make the evaluation samples. Tables 4 to 6 show the results of the Examples of the present invention, and Tables 7 and 8 show the results of the Comparative Examples.

As is seen from the results shown in Tables 4 to 8, the thermoplastic resin compositions according to the present invention showed magnificent heat-aging properties and also had excellent impact strength and fluidity. It is seen that by using a thermoplastic resin (II) containing acrylonitrile in a specified amount range, as explained in Examples 1 to 22, it is possible to remarkably improve heat-aging properties without impairing the other properties.

In contrast, the resin compositions of Comparative Examples 1 to 7, where the thermoplastic resin (II) of the present invention was not used, are very poor in heat-aging properties. Particularly in Comparative Example 5 where the acrylonitrile content in the thermoplastic resin (II) was very small and in Comparative Example 6 where the intrinsic viscosity of the resin (II) was very low, the produced resin compositions are low in Izod impact strength, too. It is to be also noted that in Comparative Example 7 where the intrinsic viscosity of the thermoplastic resin (II) was excessively high, the obtained resin composition was low in fluidity.

Also, in the Comparative Examples where although the thermoplastic resin (II) of the present invention was used the contents of the resin (II) and the polycarbonate resin (III) were outside the defined range of the present invention, the produced resin compositions were poor in heat-aging properties, the product of Comparative Example 8 being also poor in fluidity and the products of Comparative Examples 9 and 10 being low in Izod impact strength, too.

Further, in Comparative Examples 11 to 13 where it was attempted to improve heat-aging properties only by the addition of a heat-aging resistor, there was obtained almost no improving effect, even if the aging resistor was added in large quantities, which indicates that the attempts to improve heat-aging properties by such means are inexpedient.

TABLE 4

| | Example 1 | Example 2 | Example 3 | Example 4 |
|---|---|---|---|---|
| Composition (parts) | | | | |
| Component (I): I-1 | 30 | — | — | — |
| I-2 | — | 30 | — | — |
| I-3 | — | — | 30 | — |
| I-4 | — | — | — | 30 |
| Component (II): II-1 | — | — | — | — |
| II-2 | 10 | 10 | 10 | 10 |
| II-3 | — | — | — | — |
| II-4 | — | — | — | — |
| Component (III): III-1 | — | — | — | — |
| III-2 | 60 | 60 | 60 | 60 |
| Component (IV) | — | — | — | — |
| Acrylonitrile content in the composition (%) | 6.2 | 9.2 | 6.2 | 6.2 |
| Properties | | | | |
| Izod impact strength (kgf · cm/cm) | 60 | 55 | 45 | 48 |
| Fluidity (g/10 min) | 45 | 42 | 37 | 40 |
| Long-term heat-aging characteristics (%) | 60 | 86 | 82 | 84 |

| | Example 5 | Example 6 | Example 7 | Example 8 |
|---|---|---|---|---|
| Composition (parts) | | | | |
| Component (I): I-1 | — | — | — | — |
| I-2 | 30 | 30 | 30 | 30 |
| I-3 | — | — | — | — |
| I-4 | — | — | — | — |
| Component (II): II-1 | 10 | — | — | — |
| II-2 | — | — | — | 10 |
| II-3 | — | 10 | — | — |
| II-4 | — | — | 10 | — |
| Component (III): III-1 | — | — | — | 60 |
| III-2 | 60 | 60 | 60 | — |
| Component (IV) | — | — | — | — |
| Acrylonitrile content in the composition (%) | 8.7 | 9.5 | 9.2 | 9.2 |
| Properties | | | | |
| Izod impact strength (kgf · cm/cm) | 52 | 55 | 48 | 47 |
| Fluidity (g/10 min) | 43 | 42 | 39 | 55 |
| Long-term heat-aging characteristics (%) | 65 | 58 | 82 | 85 |

TABLE 5

| | Example 9 | Example 10 | Example 11 | Example 12 |
|---|---|---|---|---|
| Composition (parts) | | | | |
| Component (I): I-1 | — | — | — | — |
| I-2 | 25 | 20 | 30 | 30 |
| Component (II): II-1 | — | — | — | — |
| II-2 | 5 | 30 | 10 | 10 |
| Component (III): III-1 | — | — | — | — |
| III-2 | 70 | 50 | 60 | 60 |
| Component (IV): | | | | |
| Phenol type 1 | — | — | 0.1 | — |
| Phenol type 2 | — | — | — | 0.1 |
| Phosphorus type 1 | — | — | 0.1 | — |
| Phosphorus type 2 | — | — | — | 0.1 |
| Sulfur type 1 | — | — | 0.1 | — |
| Sulfur type 2 | — | — | — | 0.1 |
| Acrylonitrile content in the composition (%) | 7.1 | 10.1 | 9.2 | 9.2 |
| Properties | | | | |
| Izod impact strength (kgf · cm/cm) | 65 | 40 | 51 | 50 |
| Fluidity (g/10 min) | 32 | 58 | 45 | 44 |
| Long-term heat-aging characteristics (%) | 60 | 80 | 92 | 90 |

TABLE 5-continued

|  | Example 13 | Example 14 | Example 15 |
|---|---|---|---|
| Composition (parts) | | | |
| Component (I): I-1 | — | 15 | 30 |
| I-2 | 30 | 15 | — |
| Component (II): II-1 | — | — | — |
| II-2 | 10 | 10 | 10 |
| Component (III): III-1 | 30 | — | — |
| III-2 | 30 | 60 | 60 |
| Component (IV): | | | |
| Phenol type 1 | — | — | 0.5 |
| Phenol type 2 | — | — | — |
| Phosphorus type 1 | — | — | 0.5 |
| Phosphorus type 2 | — | — | — |
| Sulfur type 1 | — | — | 0.5 |
| Sulfur type 2 | — | — | — |
| Acrylonitrile content in the composition (%) | 9.2 | 7.7 | 6.2 |
| Properties | | | |
| Izod impact strength (kgf · cm/cm) | 51 | 58 | 45 |
| Fluidity (g/10 min) | 47 | 43 | 52 |
| Long-term heat-aging characteristics (%) | 85 | 72 | 82 |

TABLE 6

|  | Example 16 | Example 17 | Example 18 | Example 19 |
|---|---|---|---|---|
| Composition (parts) | | | | |
| Component (I): I-1 | — | — | — | — |
| I-1-a | 30 | — | — | — |
| I-1-b | — | 30 | — | — |
| I-1-c | — | — | 30 | — |
| I-4-d | — | — | — | 30 |
| Component (II): II-2 | 10 | 10 | 10 | 10 |
| II-5 | — | — | — | — |
| Component (III): III-1 | — | — | — | — |
| III-2 | 60 | 60 | 60 | 60 |
| Component (IV) | — | — | — | — |
| Acrylonitrile content in the composition (%) | 6.2 | 6.2 | 6.2 | 6.2 |
| Properties | | | | |
| Izod impact strength (kgf · cm/cm) | 37 | 38 | 37 | 60 |
| Fluidity (g/10 min) | 46 | 44 | 52 | 36 |
| Long-term heat-aging characteristics (%) | 61 | 59 | 60 | 62 |

|  | Example 20 | Example 21 | Example 22 |
|---|---|---|---|
| Composition (parts) | | | |
| Component (I): I-1 | 10 | 45 | 30 |
| I-1-a | — | — | — |
| I-1-b | — | — | — |
| I-1-c | — | — | — |
| I-4-d | — | — | — |
| Component (II): II-2 | 20 | 5 | — |
| II-5 | — | — | 10 |
| Component (III): III-1 | — | — | — |
| III-2 | 70 | 50 | 60 |
| Component (IV) | — | — | — |
| Acrylonitrile content in the composition (%) | 4.9 | 7.6 | 6.5 |
| Properties | | | |
| Izod impact strength (kgf · cm/cm) | 30 | 48 | 36 |
| Fluidity (g/10 min) | 38 | 42 | 43 |
| Long-term heat-aging characteristics (%) | 80 | 58 | 60 |

TABLE 7

|  | Comp. Example 1 | Comp. Example 2 | Comp. Example 3 | Comp. Example 4 |
|---|---|---|---|---|
| Composition (parts) | | | | |
| Component (I): I-1 | 30 | — | — | — |
| I-2 | — | 30 | — | — |
| I-3 | — | — | 30 | — |
| I-4 | — | — | — | 30 |
| Component (II): C-1 (Comparative component) | 10 | 10 | 10 | 10 |
| C-2 | — | — | — | — |
| C-3 | — | — | — | — |
| C-4 | — | — | — | — |
| Component (III): III-1 | — | — | — | — |
| III-2 | 60 | 60 | 60 | 60 |
| Component (IV) | — | — | — | — |
| Acrylonitrile content in the composition (%) | 7.0 | 10.0 | 7.0 | 7.0 |
| Properties | | | | |
| Izod impact strength (kgf · cm/cm) | 51 | 45 | 37 | 41 |
| Fluidity (g/10 min) | 40 | 37 | 38 | 39 |
| Long-term heat-aging characteristics (%) | 7 | 23 | 21 | 20 |

|  | Comp. Example 5 | Comp. Example 6 | Comp. Example 7 |
|---|---|---|---|
| Composition (parts) | | | |
| Component (I): I-1 | — | — | — |
| I-2 | 30 | 30 | 30 |
| I-3 | — | — | — |
| I-4 | — | — | — |
| Component (II): C-1 (Comparative component) | — | — | — |
| C-2 | 10 | — | — |
| C-3 | — | 10 | — |
| C-4 | — | — | 10 |
| Component (III): III-1 | — | — | — |
| III-2 | 60 | 60 | 60 |
| Component (IV) | — | — | — |
| Acrylonitrile content in the composition (%) | 8.0 | 9.2 | 9.2 |
| Properties | | | |
| Izod impact strength (kgf · cm/cm) | 15 | 21 | 40 |
| Fluidity (g/10 min) | 38 | 70 | 25 |
| Long-term heat-aging characteristics (%) | 30 | 45 | 45 |

TABLE 8

|  | Comp. Example 8 | Comp. Example 9 | Comp. Example 10 |
|---|---|---|---|
| Composition (parts) | | | |
| Component (I): I-1 | — | — | — |
| I-2 | 37 | 10 | 40 |
| Component (II): II-1 | — | — | — |
| II-2 | 3 | 40 | 30 |
| Comparative C-1 Component | — | — | — |
| Component (III): III-1 | 60 | — | — |
| III-2 | — | 50 | 30 |

TABLE 8-continued

| Component (IV): | | | |
|---|---|---|---|
| Phenol type 1 | — | — | — |
| Phenol type 2 | — | — | — |
| Phosphorus type 1 | — | — | — |
| Phosphorus type 2 | — | — | — |
| Sulfur type 1 | — | — | — |
| Sulfur type 2 | — | — | — |
| Acrylonitrile content in the composition (%) | 9.8 | 9.3 | 15.1 |
| Properties | | | |
| Izod impact strength (kgf · cm/cm) | 38 | 15 | 20 |
| Fluidity (g/10 min) | 26 | 65 | 72 |
| Long-term heat-aging characteristics (%) | 23 | 45 | 28 |

| | Comp. Example 11 | Comp. Example 12 | Comp. Example 13 |
|---|---|---|---|
| Composition (parts) | | | |
| Component (I): I-1 | — | — | 30 |
| I-2 | 30 | 30 | — |
| Component (II): II-1 | — | — | — |
| II-2 | — | — | — |
| Comparative C-1 Component | 10 | 10 | 10 |
| Component (III): III-1 | — | — | — |
| III-2 | 60 | 60 | 60 |
| Component (IV): | | | |
| Phenol type 1 | 0.1 | 1 | 1 |
| Phenol type 2 | — | — | — |
| Phosphorus type 1 | 0.1 | 1 | 1 |
| Phosphorus type 2 | — | — | — |
| Sulfur type 1 | 0.1 | 1 | 1 |
| Sulfur type 2 | — | — | — |
| Acrylonitrile content in the composition (%) | 10.0 | 10.0 | 7.0 |
| Properties | | | |
| Izod impact strength (kgf · cm/cm) | 43 | 40 | 48 |
| Fluidity (g/10 min) | 38 | 45 | 46 |
| Long-term heat-aging characteristics (%) | 24 | 24 | 8 |

What is claimed is:

1. A thermoplastic resin composition with excellent long-term heat-aging properties, consisting essentially of:
(I) 10 to 45% by weight of a rubber-modified thermoplastic resin obtained by graft polymerizing at least one monomer selected from the group consisting of aromatic vinyl compounds, vinyl cyanide compounds and other vinyl monomers copolymerizable therewith in the presence of ethylene-propylene rubber, ethylene-propylene-nonconjugated diene rubber or mixture thereof,
the graft ratio of the polymerizate being 10 to 100% and the intrinsic viscosity η of the methyl ethyl ketone solubles at 30° C. being 0.2 to 0.8 dl/g;
(II) 5 to 30% by weight of a thermoplastic resin obtained by copolymerizing monomers comprising 50–90% by weight of an aromatic vinyl compound, 10–20% by weight of a vinyl cyanide compound and 0–30% by weight of other vinyl monomer copolymerizable therewith,
the intrinsic viscosity qη of the methyl ethyl ketone solubles at 30° C. being 0.3 to 0.6 dl/g; and
(III) 50 to 70% by weight of a polycarbonate resin,
the total amount of (I), (II) and (III) being 100% by weight, and
wherein the content of the vinyl cyanide compound in the entire composition being 3 to 12% by weight,
the polycarbonate resin is obtained from at least one dihydroxyarryl compound as a starting material, which dihydroxarryl compound is bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxyphenyl)phenylmethane, 2,2'-bis(4-hydroxy-3-methylphenyl)propane, 2,2'-bis(4-hydroxy-3-t-butylphenyl)propane, 2,2'-bis(4-hydroxy-3-bromophenyl)propane, 2,2'-bis(4-hydroxy-3,5-dichlorophenyl)propane, 1,1'-bis(4-hydroxyphenyl)cyclopentane, 1,1'-bis(4-hydroxypenyl)cyclohexane, 4,4'-dihydroxydiphenyl ether, 4,4'-dihydroxy-3,3'-dimethyldiphenyl ether, 4,4'-dihydroxyphenyl sulfide, 4,4'-dihydroxy-3,3'-dimethylphenyl sulfide, 4,4'-dihydroxy-3,3'-dimethylphenyl sulfoxide, 4,4'-dihydroxyphenyl sulfoxide, 4,4'-dihydroxyphenylsulfone, 4,4'-dihydroxy-3,3'-dimethylphenylsulfone, 1,1'-bis(4-hydroxyphenyl)-3,3,5-trimethylcyclohexane, 1,1'-bis(4-hydroxyphenyl)-3,3-dimethylcyclohexane, 1,1'-bis(4-hydroxyphenyl)-3,3,5-trimethylcyclopentane, hydroquinone, or resorcin.

2. A thermoplastic resin composition according to claim 1, wherein the monomers of (II) thermoplastic resin comprises 72–85% by weight of the aromatic vinyl compound, 15–18% by weight of the vinyl cyanide compound and 0–10% by weight of other vinyl monomer copolymerizable therewith.

3. A thermoplastic resin composition according to claim 1, wherein the intrinsic viscosity η of (II) thermoplastic resin is 0.35 to 0.4.

4. A thermoplastic resin composition according to claim 1, wherein the dihydroxyarryl compound is 2,2'-bis(4-hydroxyphenyl)propane.

5. A thermoplastic resin composition according to claim 1, wherein the percentage of the vinyl cyanide compounds as monomer in the component (I) is 15 to 35% by weight based on the total weight of the monomers in component (I).

6. A thermoplastic resin composition according to claim 1, which further comprises (IV) 0 to 2% by weight of a heat-aging resistor, based on 100% by weight of total amount of (I), (II), (III) and (IV).

7. A thermoplastic resin composition according to claim 6, wherein the amount of (I) rubber-modified thermoplastic resin is not less than 10% and less than 45% by weight and the amount of (IV) heat-aging resistor is more than 0% and not more than 2% by weight based on 100% by weight of total amount of (I), (II), (III), and (IV).

8. A thermoplastic resin composition according to claim 6, wherein the heat-aging resistor (IV) is a three-component mixture comprising a phenol component, a phosphorus component and a sulfur component.

* * * * *